United States Patent [19]
Martin

[11] 3,820,394
[45] June 28, 1974

[54] SCALLOP MEASURING DEVICE
[75] Inventor: Roger C. Martin, Cocoa Beach, Fla.
[73] Assignee: Edgar E. Griffis, Brevard County, Fla.
[22] Filed: Oct. 13, 1972
[21] Appl. No.: 297,312

[52] U.S. Cl.............. 73/223, 137/391, 222/64, 222/71
[51] Int. Cl. .......................................... G01f 1/00
[58] Field of Search ............ 73/223, 224, 219, 290; 119/51.11, 56 R; 250/223; 222/64, 71; 177/114, 108, DIG. 6; 141/153, 195, 198; 137/386, 391, 392, 395

[56] References Cited
UNITED STATES PATENTS

| | | | |
|---|---|---|---|
| 1,891,032 | 12/1932 | Venable | 73/429 X |
| 2,183,026 | 12/1939 | Mason | 250/223 R X |
| 2,868,014 | 1/1959 | Lapeyre et al. | 73/223 |
| 3,126,068 | 3/1964 | Richardson et al. | 177/108 |
| 3,332,283 | 7/1967 | Michalowicz | 73/219 |

FOREIGN PATENTS OR APPLICATIONS

| 16,851 | 3/1882 | Germany | 73/223 |
|---|---|---|---|

Primary Examiner—Richard C. Queisser
Assistant Examiner—John P. Beauchamp
Attorney, Agent, or Firm—Berman, Bishoff & Platt

[57] ABSTRACT

As the first step in processing scallops, a conveyor belt feeds the scallops, still in their shells, into a container having a movable baffle therein for varying the volume thereof. The container comprises a narrow neck portion within which is disposed an electric eye device. The sensitivity of the electric eye is adjusted so that a single scallop falling past it will not trigger the circuit. When a sufficient quantity of scallops have been fed to the container so that the neck portion thereof is filled, the electric eye light beam is broken, deactivating the electric circuit driving the conveyor belt. At the same time, a piston is actuated to open a hinged door disposed in the bottom of the container, discharging the predetermined quantity of scallops on to a conveyor belt for further processing. After a suitable adjustable time delay in the electric eye circuit, the piston closes the door and advances a counter one digit. The conveyor belt feeding the scallops into the container is again energized and the cycle repeated.

4 Claims, 4 Drawing Figures

PATENTED JUN 28 1974

3,820,394

SCALLOP MEASURING DEVICE

The invention relates to quantity measuring devices and more particularly to a device for measuring a predetermined quantity of scallops, or other bivalves, and feeding the bivalves to apparatus for further processing, such as cleaning, separating and eviscerating.

In the past, there has been no known effective method and apparatus for feeding a metered quantity of scallops or other bivalves from the initial station in a processing plant on to the other processing apparatus such as shelling, cleaning, separating, eviscerating and sorting devices. Such a measuring and feeding device is highly desirable for at least two reasons. First, it enables the processor to keep track of the quantity of scallops or other bivalves transferred from a boat to the processing plant for purposes of payment and record keeping. Secondly, it enables the further processing apparatus to be fed with only a predetermined quantity of scallops or other bivalves so that jam-ups leading to a breakdown of the apparatus will not occur.

Accordingly, it is a principal object of the present invention to provide a measuring device for scallops, or other bivalves, for automatically feeding a predetermined metered quantity of such bivalves to further processing apparatus.

A further object of the present invention is to provide a measuring device for scallops, or other bivalves, of the type described which automatically records the quantity of bivalves fed to the processing apparatus.

Still another object of the present invention is to provide a measuring device for scallops, or other bivalves, of the type described which can be adjusted to feed variable quantities of such bivalves to the processing apparatus.

Briefly, the measuring device of the present invention comprises a container having a narrow neck portion at the upper end thereof and a hinged pivotably mounted bottom section actuated by a piston. Disposed in the upper neck portion, is a photoelectric cell and electric eye beam, which is interrupted when scallops or other bivalves have filled the container up to the neck portion containing the photoelectric cell. Interruption of the electric eye beam generates an electric pulse which actuates a piston to open the bottom of the container and discharge the contents thereof on to a conveyor belt for further processing. The electric pulse also serves to deactivate the conveyor belt feeding the bivalves into the container. After a suitable time delay, the piston closes the door, the feeding conveyor is again energized and the cycle is repeated. A counter is provided which is advanced one digit each time the photoelectric circuit is interrupted. Disposed within the container is a baffle which may be adjusted by means of mounting screws to vary the effective storage volume of the container. Thus, each time the counter is advanced, a record is made that, for example, one bushel of scallops has been received and discharged for further processing.

Other objects, advantages and features of the present invention will be more readily appreciated from the following detailed description taken in conjunction with the drawing, in which.

Figure 1:
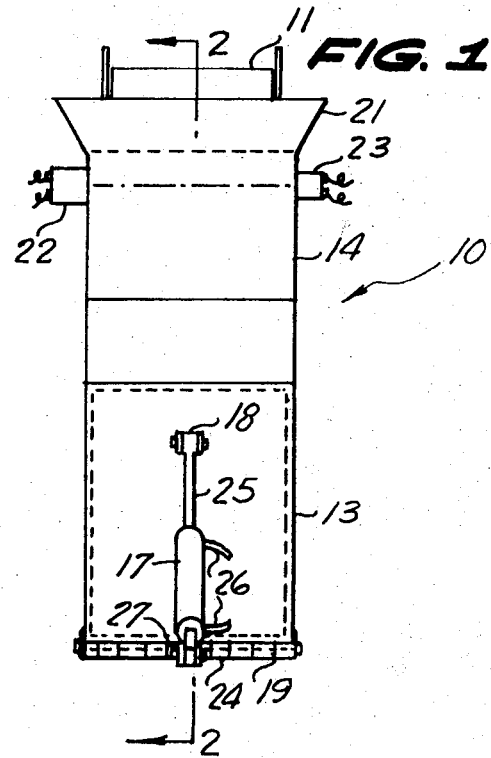
FIG. 1 is a side elevational view of the measuring device of the present invention.

Referring now to the drawings, wherein like reference characters designate like parts throughout the several views thereof, there is shown the scallop measuring device of the present invention generally designated by the reference character 10. As shown therein, the measuring device comprises a container 13 of generally rectangular cross-section having an upper constricted neck portion 14 and a lower door 20 having hinged connection 19 for permitting the door to swing between the closed position shown in full line in FIG. 2 and the open position shown in dotted lines.

Figure 2:
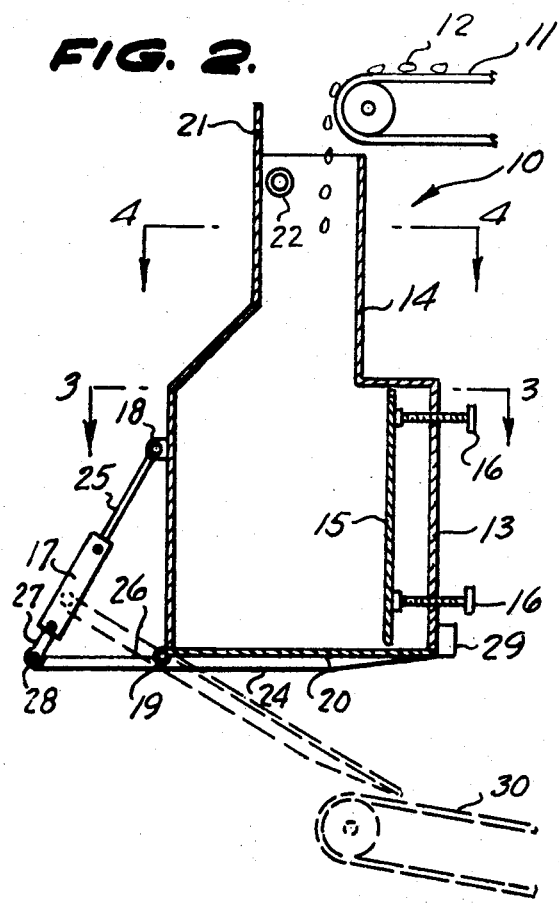
FIG. 2 is a sectional view taken on the line 2—2 in FIG. 1, looking in the direction of the arrows.
Figure 3:
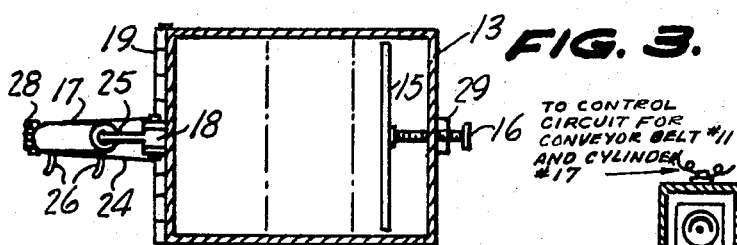
FIG. 3 is a transverse cross-section taken on the line 3—3 in FIG. 2, looking in the direction of the arrows.

The mechanism for opening and closing door 20, in a manner to be described more fully hereinbelow, comprises cylinder 17 having hydraulic lines 26 attached thereto in a conventional manner for connection with a source of vacuum and pressure in order to move piston rod 25 from the fully extended position shown in full lines in FIG. 2 to the retracted position, so as to cause door 20 to pivot about hinge 19 to the open position shown in dotted lines. Piston rod 25 is connected at hinge 18 to the side of container 13 while the other end of cylinder 17 has rigidly attached thereto arm 27. Supporting member 24 is connected between the bottom of door 20 and hinge 19 and hinge 28 to arm 27.

Figure 4:
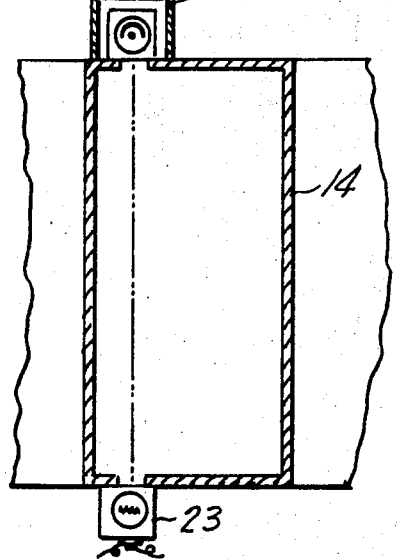
FIG. 4 is an enlarged partial transverse section taken on the line 4—4 in FIG. 2, looking in the direction of the arrows.

Disposed at opposite sides of constricted neck portion 14 of container 13, as best shown in FIG. 4, are photoelectric cell 22 and electric eye beam source 23. It can be seen that when the scallops or other bivalves have filled container 13 and neck portion 14 to the point where the path between photoelectric cell 22 and source 23 is blocked, an electric impulse will be generated in accordance with well known electronic techniques. Counter 29 is provided which advances one count each time such an electric impulse is generated. Photoelectric cell 22, source 23 and counter 29 are all standard components and may, for example, be self-contained in a single unit such as Model A750, manufactured by Autotron, Inc. of Danville, Illinois, which model, in addition to having a photoelectric cell, source and impulse counter, also has a built-in control for adjusting the sensitivity of the photoelectric cell and an adjustable time delay for turning on photoelectric cell 22 after contact has been interrupted with source 23. While the aforementioned self-contained unit may be used with the present invention, it should be realized that other readily available standard components may likewise be used.

In order to vary the capacity of container 13 and thus control the quantity of scallops measured and passed on for further processing, movable baffle 15 connected to the side wall of container 13 by adjusting screws 16 is provided. In a preferred embodiment, the volume of container 13 may be varied from 1,935 cubic inches to 2,365 cubic inches by means of movable baffle 15. The nominal volume of container 13 is 1 bushel.

In operation, scallops 12 are fed into container 13 by means of conventional conveyor belt 11. Baffle 21 is provided on neck portion 14 of container 13 to insure that the scallops will be directed downwardly into the container. When the container has been filled up to the neck portion so that the electric eye beam, generated by source 23, is broken, an electric impulse is generated. It should be noted that the sensitivity of photoelectric cell 22 should be adjusted so that a single scallop falling through the beam will not affect it. The electric impulse thus generated does three things simultaneously. It actuates the hydraulic controls for cylinder 17 so as to cause piston rod 25 to be retracted within the cylinder and thus open door 20 through the linkage described above; it deactivates the control circuitry driving conveyor belt 11, causing the belt to stop feeding scallops to the container; and it advances counter 29 one count. The predetermined quantity of scallops contained within container 13 will thus be dropped through the bottom of container 13 on to conveyor belt 30 for further processing. After a predetermined time delay in the recovery time of the photoelectric cell, which may be adjusted as described above, conveyor 11 is again energized, door 20 is closed and the cycle repeats itself. Counter 29 will thus automatically provide a record of the number of cycles which the apparatus has gone through and consequently a record of the number of bushels of scallops, or other bivalves delivered to belt 30 for further processing.

While a specific embodiment of the invention has been described, it will be understood that variations may be made therein by those skilled in the art without departing from the essential spirit and inventive concept embodied in the measuring device described. Therefore, it is intended that the scope of the invention be limited only by the claims appended hereto.

I claim:

1. A device for measuring and feeding for further processing a predetermined quantity of shellfish comprising:
    a. container means having a main shellfish receiving portion and an upper neck portion;
    b. means for feeding shellfish into said container through said neck portion;
    c. a photoelectric cell and light beam source being located on opposite sides of said neck portion, so that when said shellfish reach the level of said light beam source in said neck portion, the light beam is interrupted and an electrical impulse is generated;
    d. a door disposed in the bottom of said container normally retained in the closed position; and
    e. hydraulic means for opening said door in response to said electrical impulse.

2. The device set forth in claim 1, wherein said hydraulic means comprises piston means for retaining said door closed in its fully extended position and cylinder means for retracting said piston to open said door.

3. The device set forth in claim 2 further including means for adjusting the capacity of the main shellfish receiving portion of said container.

4. The device set forth in claim 3 further including counter means for recording a count each time an electrical impulse is generated and means for stopping said feeding means for a predetermined period of time in response to the generation of an electrical impulse.

* * * * *